No. 846,795.

PATENTED MAR. 12, 1907.

A. H. KRUESI.
SHAFT BEARING.
APPLICATION FILED SEPT. 30, 1905.

2 SHEETS—SHEET 1.

Witnesses:
Marcus L. Byng.
Helen Orford.

Inventor:
August H. Kruesi,
by Albert G. Davis
Att'y.

No. 846,795. PATENTED MAR. 12, 1907.
A. H. KRUESI.
SHAFT BEARING.
APPLICATION FILED SEPT. 30, 1905.

2 SHEETS—SHEET 2.

Witnesses:
Marcus L. Byng.
Helen Alford

Inventor:
August H. Kruesi,
by Albert H. Davis
Att'y.

UNITED STATES PATENT OFFICE.

AUGUST H. KRUESI, OF SCHENECTADY, NEW YORK, ASSIGNOR TO GENERAL ELECTRIC COMPANY, A CORPORATION OF NEW YORK.

SHAFT-BEARING.

No. 846,795.　　　Specification of Letters Patent.　　　Patented March 12, 1907.

Application filed September 30, 1905. Serial No. 280,783.

*To all whom it may concern:*

Be it known that I, AUGUST H. KRUESI, a citizen of the United States, residing at Schenectady, in the county of Schenectady and State of New York, have invented certain new and useful Improvements in Shaft-Bearings, of which the following is a specification.

The present invention relates to shaft-bearings, and more particularly to combined step and guide bearings for upright turbine or other shafts, and has for one of its objects to provide an improved construction whereby the bearings may each be supplied by a separate lubricating system—as, for example, the step-bearing may be supplied with water and the guide-bearing with oil.

In turbines it is customary to locate the step and guide bearings in a casing that is arranged in the chambered base of the machine, which receives the exhaust from the wheel-casing and condenses it by means of a condenser located therein or discharges it into a condenser arranged exterior to the chamber. In order that the vacuum of the condenser system may not be impaired by leakage of air through the bearing, a packing is required around the shaft where it enters the bearing-casing. A further object of the invention is to provide a suitable packing for this purpose. I use in this connection a hydraulic packing for the shaft, in which a continuous flow of water is maintained, preferably by means of the system supplying the step-bearing, although a separate system for this purpose may be employed, if desired.

For an understanding of the details of construction and combination of parts reference is to be had to the following description and to the claims appended hereto.

Figure 1:
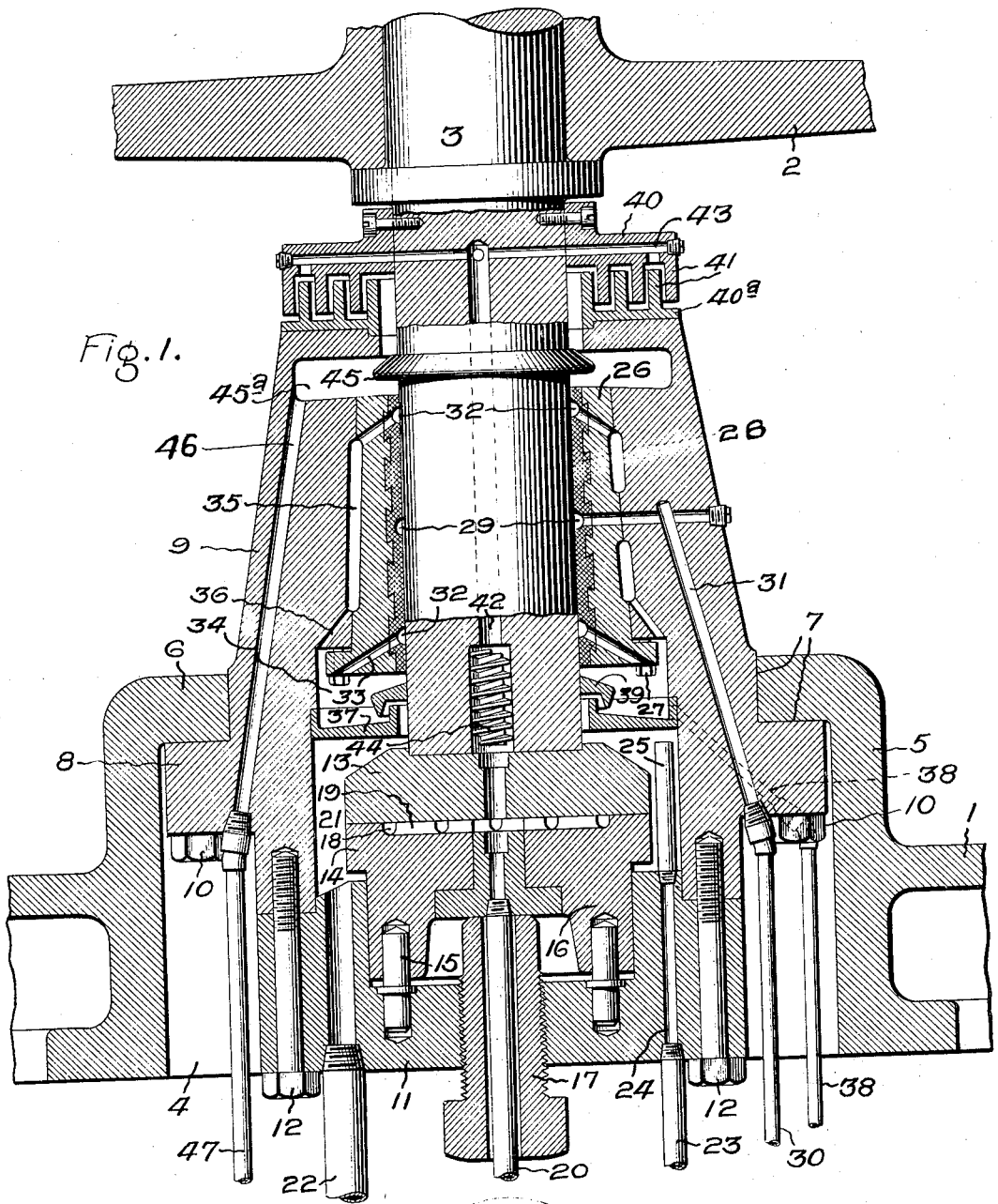
Figure 3:
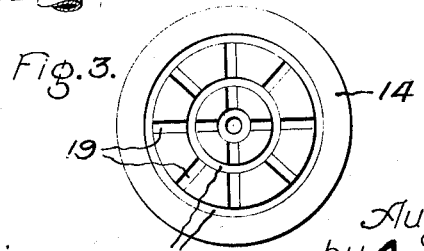
Figure 2:
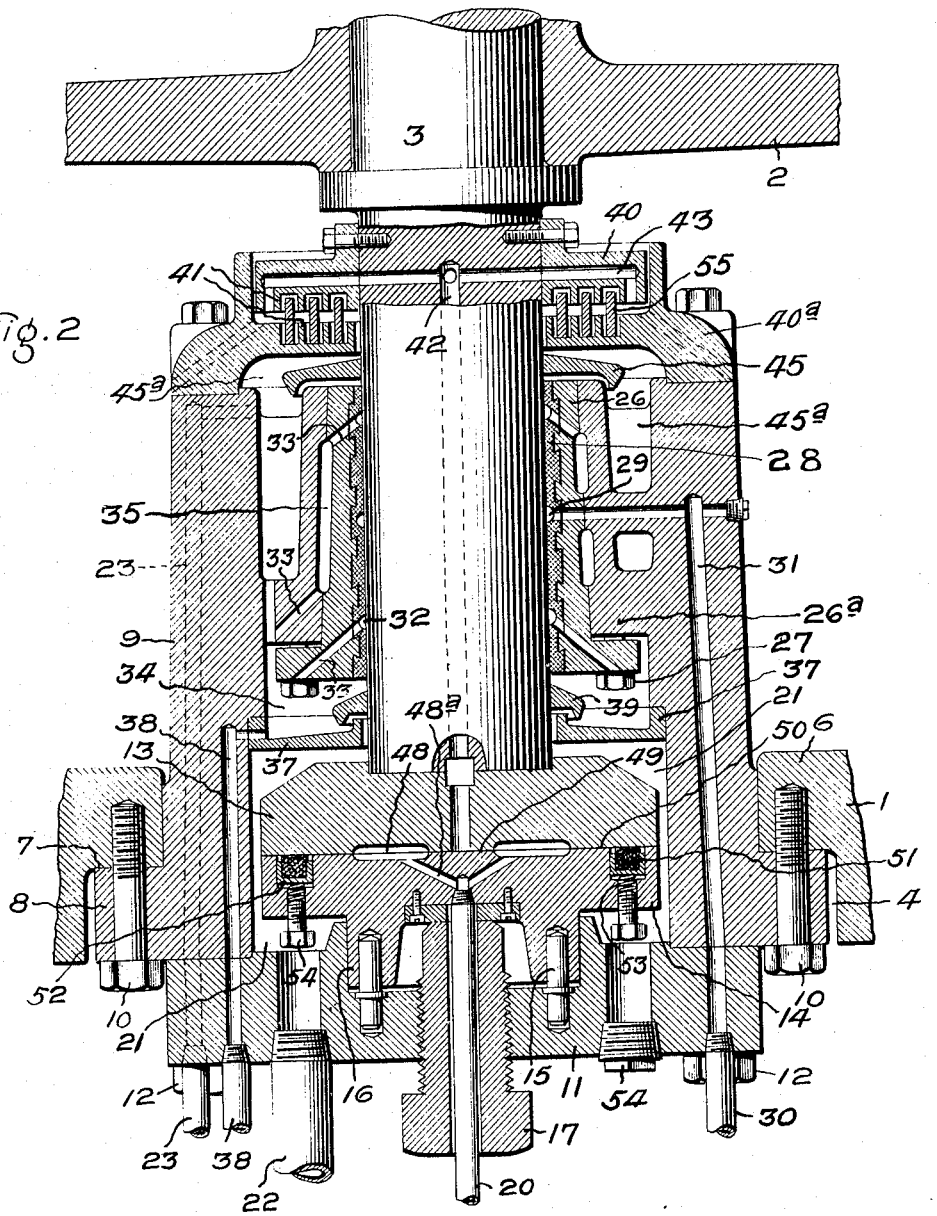
Figure 4:
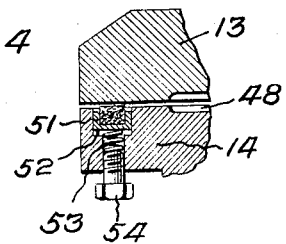

In the accompanying drawings, which illustrate one embodiment of the invention, Figure 1 is a central vertical section of a bearing. Fig. 2 is a similar section of a modified form of bearing. Fig. 3 is a plan view of the lower bearing-block of the step-bearing, and Fig. 4 is a detail sectional view of a portion of the bearing-blocks.

Referring to the drawings, 1 represents the bottom of the base of a turbine that is chambered to receive the exhaust from the turbine-wheels, a portion of one of which latter is shown at 2, mounted on a vertical shaft 3. The base 1 is provided with a central opening 4, in which is mounted the bearings for the shaft. At the opening 4 is provided an upwardly-extending cylindrical flange 5, provided with the overhanging portion or shoulder 6. The cylindrical and bottom surfaces 7 of the shoulder 6 are carefully machined to fit an annular shoulder or flange 8 of the bearing-casing 9 and form a practically air-tight joint. The casing is secured in place by means of bolts 10 passing through the shoulders 6 and 8. The casing is cast with a cylindrical chamber at its lower portion and with a reduced tapering bore at its upper portion, the latter receiving the guide-bearing and the former the step-bearing. The bottom of the casing is closed by means of a bottom plate 11, which is shouldered so as to center itself in the lower end of the casing and is held in place by bolts 12. A sufficient number of bolts 10 and 12 are provided to amply sustain the weight of the shaft and the members carried thereby. The step-bearing comprises an annular or disk-shaped bearing-block 13, which is fitted and suitably keyed to the lower end of the shaft 3, so as to rotate therewith. Below the said block is a lower bearing-block 14, which is prevented from rotating by means of studs 15, secured to the bottom plate 11. The lower block, though non-rotatable, is capable of a limited vertical movement for the purpose of adjusting the clearance between the relatively movable parts of the turbine by raising or lowering the shaft. To guide the movement of the block, the latter is provided with a piston-like extension 16, that is guided in a cylindrical depression or recess in the bottom plate 11.

In order to raise or lower the bearing-block 14, a screw 17 is provided that enters a tapped opening in the bottom plate 11. The upper surface of the lower bearing-block is provided with concentric grooves 18 and connecting radial grooves 19, Figs. 1 and 3, by means of which the water or other medium is caused to act on an extended area on the upper block. Water is supplied to the grooves 18 and 19 of the lower bearing-block by supply-pipe 20, which extends through the adjusting-screw 17 and is attached to the bearing-block. The cylindrical chamber 21, formed by the lower end of the casing and the bottom plate, is somewhat larger in diameter than the bearing-blocks, so as to receive the water discharged from between the latter and act as a drainage-chamber. The discharged water finds exit through a drain-pipe 22, communicating with the drainage-chamber, and flows back to the source of supply. In order to provide for free discharge of the water through the drain-pipe, a vent or air-equalizing conduit 23 is arranged to communicate with the upper part of the chamber through a bore 24 and a short stand-pipe 25. In case of stoppage of the drain-pipe 22 the pipe 25 constitutes an overflow, preventing the water from rising and entering the guide-bearing compartment or chamber.

The upper or reduced portion of the casing 9 is interiorly tapered, and fitting therein is a thimble or shell 26 of the guide-bearing. The lower portion of the thimble is circumferentially flanged and extends under an internal shoulder on the casing and by means of bolts 27 is held in place. Formed in and held by dovetail projections from the interior surface of the shell is a lining 28 of Babbitt, which surrounds the shaft and is separated therefrom by a slight clearance. About midway the ends of the lining on the inner surface thereof is formed an annular groove 29 to receive lubricant. The lubricant, such as oil, is supplied under pressure from a suitable source through the pipe 30, that connects with a passage 31, drilled in the bearing-casing 9 and shell 26. The lubricant flows from the groove 29 between the shaft and lining to opposite ends of the latter, where are formed annular collecting-grooves 32, from which, at the lower end, it escapes through passage 33 to a chamber 34 below the guide-bearing. Between the shell 26 and the casing is a chamber 35, by way of which lubricant from the upper collecting-groove 32 flows into the chamber 34, the discharge from said chamber taking place through the drainage-passages 36. The guide-bearing compartment of the casing is separated from the compartment containing the step-bearing by a diaphragm or partition 37, that acts as a basin and receives the oil drained from the guide-bearing and discharges it through a drain-conduit 38. In order to prevent oil from creeping along the shaft into the step-bearing compartment containing water, a deflector 39 is arranged on the shaft at a point above the diaphragm, the same collecting the oil from the shaft and throwing it outwardly into the chamber 34 by reason of centrifugal force.

Surmounting the bearing-casing is a water packing. This comprises a collar 40, secured to and rotating with the turbine-shaft, and a stationary annular member 40ª, supported on the upper end of the bearing-casing. The adjacent surfaces for these two members are concentrically tongued and grooved, and the tongues 41 formed thereby interlace in such a manner as to provide a restricted and tortuous passage through which a water or other medium is adapted to flow, and thereby form a complete seal between the interior of the bearing-casing and the chambered base of the turbine. This seal prevents leakage of air to the base, and but for the seal the lower pressure in the region surrounding the bearings and their casing would cause the lubricant supplied under a higher pressure to the bearings to flood the upper portion of the casing and flow outward into the surrounding region. As a matter of simplicity the supply fluid for the hydraulic packing is taken from the same source that supplies the step-bearing. As one way of accomplishing this a conduit 42 is provided which extends centrally through the upper bearing-block and the shaft to a point where the collar 40 is located, and extending radially from the conduit through the shaft and the collar 40 are passages 43, emptying into one or more grooves of the packing. In order to prevent the water supplied to the step-bearing from taking a path of least resistance—namely, that through the conduit 42, and thus exerting an insufficient pressure between the bearing-blocks—a baffling device 44 is provided in the conduit, the same functioning to set up a back pressure of such a value that a fluid film will always be maintained between the bearing-blocks.

The major portion of the water supplied to the packing merely discharges outwardly into the turbine-base. Some, however, works its way inwardly through the tortuous passage between the members 40 and 40ª and overflows between the shaft and packing and drops on deflector 45 in a chamber 45ª, cored out in the upper end of the bearing-casing, and from the latter the water drains through a conduit 46 and drain-pipe 47 back to the source. By this arrangement as long as the fluid-pressure is maintained in the step-bearing-supply system a perfect seal against the admission of air is provided at the packing.

Referring to Fig. 2, the parts of which corresponding to similar parts in Fig. 1 being designated by similar reference characters, a different means for obtaining a difference of pressure between the fluid supplied to the step-bearing and packing is employed. In this case an annular chamber 48 is formed between the two bearing-blocks, to which the water under high pressure is delivered through branches 48ª, leading from the supply-pipe 20. The fluid in passing to the conduit 42 in the shaft must flow inwardly from the annular chamber between the portions of the two bearing-blocks, (indicated at 49,) and in doing so it does its share in supporting the weight of the shaft. By this means the pressure is reduced to the proper point by the time the fluid reaches the conduit. In order to throttle the escape of fluid outwardly from the annular chamber 48 and between the blocks at the portions 50, an adjustable annular ring 51, of carbon or equivalent material, is employed, which is seated in a groove in the lower bearing-block. This ring is held in a holder 52, of channel-shaped cross-section, that is supported on springs 53, interposed between it and adjusting-screws 54, the latter being arranged in suitable numbers around the bearing-block.

As shown in Fig. 4, the bearing-blocks are separated by a film the thickness of which is considerably exaggerated. By means of the packing-ring 51 the free discharge of the film from between the blocks may be restricted to any desired degree by adjusting the screws. The effect of the ring is to produce a back pressure due to the throttling, so that a certain portion of the fluid will pass up through the conduit 42 to the packing. The packing-ring 51, being spring-supported, will readily yield and lower into the groove under the weight of the shaft whenever the pressure on the step-bearing is relieved, thus permitting the lower bearing-block to directly sustain the weight of the shaft and its parts. Also in this modification the construction of the hydraulic packing is slightly different. The grooves in the two members 40 and 40ª register, and the rings 55 are assembled in the registering grooves. By this construction a more tortuous path for the water is provided, so that higher pressures may be employed. The water that escapes inwardly from this packing is conveyed into the chamber 45ª, and thence discharges into the drainage-chamber 34 and drains off with the lubricant.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. The combination of a shaft, a chambered base surrounding the shaft, a hydraulic bearing for supporting the shaft, a liquid packing which acts as a seal to prevent the passage of air from the bearing into the base, and a means for maintaining a constant flow of liquid through the packing when the shaft is in operation.

2. The combination of a shaft, a bearing which supports the shaft by a fluid under pressure, a guide-bearing for the shaft, means for continuously maintaining said pressure, a second means independent of the first for lubricating the guide-bearing, and a liquid packing supplied by the first-mentioned means which acts as a seal to prevent leakage from the guide-bearing.

3. The combination of a shaft, a chambered base around the shaft, a bearing which supports the shaft by a fluid film, means for continuously maintaining the film under pressure, and a liquid packing supplied by said means which acts as a seal to prevent air from leaking from the bearing into the chambered base.

4. The combination of a shaft, a chambered base surrounding the shaft, a hydraulic step-bearing for the shaft, a guide-bearing for the shaft, means for supplying lubricant to the step and guide bearings, and a liquid seal between the bearings and the chambered base.

5. The combination of a shaft, a bearing which supports the shaft by a fluid film, a fluid packing for the shaft which prevents pressure from leaking through the bearing, a source of fluid under pressure which maintains a constant flow through the bearing, and a conduit in the shaft which conveys fluid from the bearing to the packing.

6. The combination of a shaft, a bearing which hydraulically supports the shaft, a fluid packing for the shaft, a source of fluid under pressure which maintains a constant flow through the bearing, a conduit in the shaft which receives fluid from the bearing and supplies it to the packing, and separate drains for the packing and bearing.

7. The combination of a shaft, a hydraulic bearing for supporting the same, a casing for the bearing, a hydraulic packing around the shaft, a source of fluid under high pressure which supplies both the bearing and the packing, and means for diminishing the pressure of the fluid before it reaches the packing.

8. The combination of a shaft, a hydraulic bearing for supporting the same, a casing for the bearing, a hydraulic packing around the shaft, a source of fluid under high pressure which supplies both the bearing and the packing, and means located within the bearing-casing for diminishing the pressure of the fluid before it reaches the packing.

9. The combination of a shaft, a step-bearing therefor, an inclosure for the bearing which is subjected to a pressure different from that of the atmosphere, and a packing around the shaft for preventing pressure from escaping through the bearing, said packing comprising a member supported on the bearing, a member rotating with the shaft which coöperates with the other member, and means for supplying fluid to the space between the members.

10. The combination of a shaft, a step-bearing therefor, an inclosure for the bearing which is subjected to a pressure different from that of the atmosphere, and a packing round the shaft for preventing fluid from escaping through the bearing, said packing comprising a series of annular members supported on the bearing, a device mounted on and rotating with the shaft which is provided with a series of annular members which coöperate with those of the other series to hold a body of fluid, and means for supplying fluid between the members to form a seal.

11. The combination of a shaft, a step-bearing therefor, an inclosure for the bearing, and a packing round the shaft for preventing fluid under pressure from escaping through the bearing, said packing comprising a series of annular members surrounding the shaft and located on the bearing, a collar secured to the shaft which is provided with a series of concentric annular members coöperating with the other series to form a restricted passage, and means for forcing fluid through said passage.

12. The combination of a shaft, a step-bearing therefor, an inclosure for the bearing which is subjected to a pressure different from that of the atmosphere, and a packing around the shaft for preventing fluid under pressure from escaping through the bearing, said packing comprising two relatively rotating members having registering grooves in adjacent surfaces and separated by a space, rings arranged in the grooves which coöperate therewith to form a restricted passage, and means for supplying fluid to said passage.

13. In a turbine, the combination of a chambered base which is adapted to receive the exhaust-fluid from the turbine-wheels, a shaft extending into the base, a step-bearing therefor located in the base, means for supplying fluid to the bearing to hydraulically support the shaft, a hydraulic packing around the shaft for preventing leakage of the fluid under pressure from the bearing, and means for supplying fluid from the bearing to the packing.

14. The combination of a shaft, a step-bearing therefor, a guide-bearing, a casing common to both bearings, and independent lubricating systems for supplying the bearings.

15. The combination of a shaft, a step-bearing therefor, a guide-bearing, a casing common to both bearings, independent lubricating systems for supplying the bearings, and means located within the casing for preventing free mingling of the lubricants from the two systems.

16. The combination of a shaft, a step-bearing therefor, a guide-bearing, a casing inclosing the bearings, separate means for supplying lubricant to the bearings, and separate drainage systems which convey exhaust-lubricant away from the bearings.

17. The combination of a shaft, a bearing-casing which is divided into two compartments, a step-bearing in one compartment, a guide-bearing in the other, means for supplying lubricant to each of the bearings, the lubricant from each bearing draining into its respective compartment, and separate drainage-conduits leading from the compartments.

18. The combination of a shaft, a bearing-casing, a step-bearing arranged in the lower end thereof, a guide-bearing located in the upper end of the casing, means for supplying lubricant to the bearings, a diaphragm or drainage-basin between the two bearings which receives lubricant from the guide-bearing, and a discharge-conduit leading from said basin.

19. The combination of a shaft, a step-bearing, a guide-bearing, a fluid packing that forms a seal, means for supplying lubricating fluid to the bearings and also to the packing, a deflector on the shaft between the two bearings for preventing the fluid discharged from one bearing from mixing with that discharged from the other, and a deflector on the shaft between the packing and one of the bearings for deflecting the fluid discharged from the packing.

20. The combination of a shaft, a step-bearing, a guide-bearing, a fluid packing, means for supplying lubricating fluid to the bearings and also to the packing, a deflector on the shaft between the two bearings for preventing the fluid discharged from one bearing from mixing with the discharge from the other, a deflector on the shaft between the packing and one of the bearings for deflecting the fluid discharged from the packing, and separate drainage systems for the bearings and packing.

21. The combination of a shaft, a step-bearing, a guide-bearing, a fluid packing, means for supplying fluid to the bearings and also to the packing, a deflector on the shaft between the two bearings for preventing the fluid discharged from one bearing from mixing with that discharged from the other, a deflector on the shaft between the packing and one of the bearings for deflecting the fluid discharged from the packing, separate drainage systems for the bearings and packing, a casing for the bearings provided with lubricant-collecting chambers for receiving the discharge from the bearings and packing, and drainage-conduits connected with the chambers.

22. In combination, a shaft, relatively movable bearing-blocks therefor provided with a chamber between them, means for supplying fluid to said chamber at a pressure sufficient to maintain a fluid film between the blocks, a casing inclosing the bearing-blocks which forms a chamber to receive the exhaust discharged between the latter, a packing around the shaft for preventing the escape of pressure through said casing, and means for receiving the fluid discharged from said bearing at a decreased pressure and supplying it to the packing.

23. In combination, a shaft, relatively rotatable bearing-blocks therefor provided with a chamber between them, means for supplying fluid to said chamber at a pressure sufficient to maintain a film between the blocks, means for regulating the discharge of fluid between the blocks, a hydraulic packing around the shaft, and means for supplying fluid discharging from between the blocks to said packing.

24. The combination of a shaft, relatively rotatable bearing-blocks therefor provided with a chamber between them, a casing for the bearing-blocks and shaft which receives fluid discharged from between the bearing-blocks, a structure in which the bearing-casing is located that is subjected to a pressure different from that of the atmosphere, a hydraulic packing around the shaft for preventing leakage of fluid under pressure from the casing, a conduit in the shaft which receives fluid from between the bearing-blocks at a pressure lower than the supply-pressure and delivers it to the packing, and an adjustable device between the bearing-blocks for proportioning the amount of fluid discharging to the packing and exhausting from the blocks into the bearing-casing.

25. The combination of a shaft, relatively rotatable bearing-blocks therefor provided with a chamber between them, a casing for the bearing-blocks and shaft which receives fluid discharged from between the bearing-blocks, a structure in which the bearing-casing is located, a hydraulic packing around the shaft for preventing leakage of fluid under pressure from the casing, a conduit in the shaft which receives fluid from between the bearing-blocks at a pressure lower than the supply-pressure and delivers it to the packing, and a yieldingly-supported and adjustable ring carried by one of and arranged between the bearing-blocks for proportioning the amount and pressure of the fluid supplied to the packing.

26. The combination of a shaft, a bearing for the shaft which is exposed to a given pressure, an inclosure for the bearing which is subjected to a different pressure, and a packing for preventing leakage between the bearing and the inclosure comprising series of overlapping, spaced, concentric annular members suitably supported by the shaft and the bearing respectively to form a tortuous passage, and means for supplying liquid to said passage.

27. The combination of a shaft, a step-bearing for the end of the shaft, a guide-bearing for the shaft adjacent the step-bearing, a casing within which the bearings are supported, means for supplying lubricant to the bearings under pressure, and a liquid sealing device for preventing leakage between the interior and exterior of the casing.

In witness whereof I have hereunto set my hand this 25th day of September, 1905.

AUGUST H. KRUESI.

Witnesses:
W. L. BLENKISON,
S. M. BARBER.